United States Patent [19]

Swenson et al.

[11] Patent Number: 4,523,275
[45] Date of Patent: Jun. 11, 1985

[54] CACHE/DISK SUBSYSTEM WITH FLOATING ENTRY

[75] Inventors: Robert E. Swenson, Mendota Heights, Minn.; Lawrence D. Sasscer; Don M. Robinson, both of San Jose, Calif.

[73] Assignee: Sperry Corporation, New York, N.Y.

[21] Appl. No.: 477,563

[22] Filed: Mar. 21, 1983

Related U.S. Application Data

[63] Continuation-in-part of Ser. No. 207,060, Nov. 14, 1980, abandoned.

[51] Int. Cl.³ .................... G06F 11/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,136,385 | 1/1979 | Gannon et al. | 364/200 |
| 4,156,906 | 3/1979 | Ryan et al. | 364/200 |
| 4,317,168 | 2/1982 | Messina et al. | 364/200 |
| 4,332,010 | 5/1982 | Messina et al. | 364/200 |
| 4,394,733 | 7/1983 | Swenson | 364/200 |
| 4,463,420 | 7/1984 | Fletcher | 364/200 |
| 4,481,573 | 11/1984 | Fukunaga | 364/200 |
| 4,482,952 | 11/1984 | Akagi | 364/200 |

*Primary Examiner*—Harvey E. Springborn
*Attorney, Agent, or Firm*—Griffin, Branigan & Butler

[57] ABSTRACT

In a system having a host processor connected through a storage control unit to a cache store and a plurality of disk devices, segments of data which have been written to, while resident in the cache store, are transferred to the disks at some later time. If an abnormal condition, such as a bad spot on the disk, prevents the transfer of a segment from the cache store to the disk, an indicator is set for that segment by the storage control unit to prevent further attempts to transfer the segment. A segment whose indicator is set remains in the cache store until the host processor issues an initialize or a reset segment command.

9 Claims, 3 Drawing Figures

CACHE/DISK SUBSYSTEM WITH FLOATING ENTRY

RELATED APPLICATIONS

This application is a continuation-in-part of application Ser. No. 207,060 filed Nov. 14, 1980, which is now abandoned, and relates to copending applications Ser. No. 207,152 filed Nov. 14, 1980 by Robert E. Swenson, now U.S. Pat. No. 4,394,733, Ser. No. 354,556 filed Mar. 3, 1982 by Hamstra et al., and Ser. No. 460,737 filed Jan. 25, 1983 by Robert E. Swenson et al., all assigned to the same assignee as the present application.

BACKGROUND OF THE INVENTION

Copending application Ser. No. 207,152 discloses a data processing system having a plurality of host processors, a cache store, a plurality of disk drive devices for driving storage disks, and first and second storage control units for controlling transfers of data between the host processors, the cache store and the disks. The host processors issue commands defining an operation to be performed, each command including an address specifying the disk space at which the operation is to be performed. The management of data in the cache store is by segments, each segment including a plurality of data words. When a host processor issues a command (i.e. write), the storage control unit, after checking the disk device and finding it busy, then checks the cache store to determine if a copy of the data from the specified disk space is resident in the cache store. If it is, then the storage control unit receiving the command controls the transfer of data from the host processor to the cache store. If a copy of the data from the specified disk space is not resident in the cache store then it is brought into a storage control unit, overlayed with the data from the host processor, and the resulting segment(s) of data written into the cache store.

Segments of data which have been modified or "written-to" while resident in the cache store are subsequently transferred to the disks for permanent storage. As explained in application Ser. No. 354,556, this is accomplished under the control of a storage control unit which forms "trickle" commands when it has no higher priority task to perform. There is a command queue for each disk device and a storage control unit places the trickle commands it generates in the queues. A trickle command is executed by a storage control unit when it becomes the highest priority command in its queue. Since a long interval of time, relatively speaking, may elapse between the time that a segment is written-to and the time the written-to segment is transferred to a disk, error recovery may prove difficult if, for example, a bad spot on a disk prevents the written-to segment from being transferred to the disk. Rather than terminate normal processing, the present invention provides a novel method and means for retaining the written-to segment in the cache store until such time as a host processor is ready to perform an error recovery procedure, this usually being at the time the host processor is ready to close the file. Meanwhile, the storage control units are prevented from again attempting to transfer the written-to segment to a disk.

SUMMARY OF THE INVENTION

An object of the present invention is to provide a method and apparatus for handling segments of data which cannot be transferred from a cache store to a bulk memory because of an error condition, said method and apparatus providing for maintaining such segments in the cache store until such time as a processor is ready to attempt a recovery from the error.

An object of the present invention is to provide a novel method and apparatus for handling recovery from certain error conditions occuring during the transfer of data from a cache store to a bulk memory without terminating the normal processing routine.

An object of the present invention is to provide an improvement in a system of the type wherein written-to segments in a cache store are subsequently transferred to a bulk memory by forming and queuing a command for controlling the transfer, the improvement comprising means for detecting an error condition which prevents the transfer of a written-to segment to the bulk memory and means responsive to the detecting means for setting an indicator to prevent a second command from being formed to transfer the segment.

Another object of the invention is to provide a method for handling written-to segments of data which cannot be transferred from a cache store to a bulk memory, said method comprising deleting the command for controlling the transfer and setting an indicator to prevent a further command from being generated to control the transfer.

Other objects of the invention and its mode of operation will become apparent upon consideration of the following description and the accompanying drawings.

BRIEF DESCRIPTION OF THE DRAWINGS

FIG. 2 shows the format of the words comprising a command queue; and,

FIG. 3 shows the format of the words in a segment descriptor table.

DETAILED DESCRIPTION OF THE INVENTION

Figure 1:
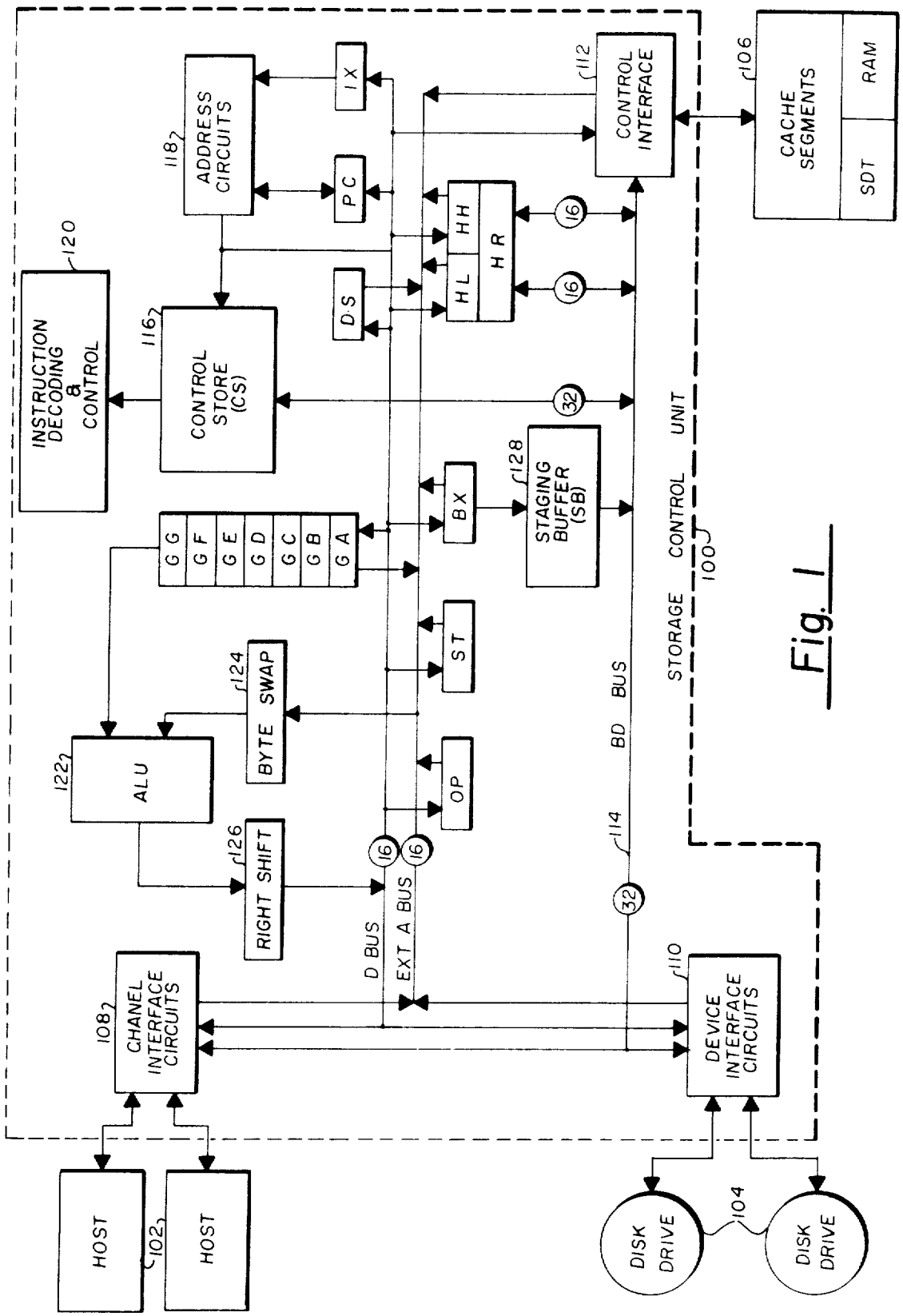
FIG. 1 is a block diagram of a data processing system having a cache memory and a plurality of disk drive devices connected to a plurality of host processors through a single storage control unit.

FIG. 1 is a block diagram of a cache/disk system of the type described in U.S. patent application Ser. No. 207,152 filed Nov. 14, 1980, now U.S. Pat. No. 4,394,733 and reference may be made to that patent for a complete description of a system in which the present invention may be utilized. The system as illustrated in FIG. 1 includes a storage control unit 100 for interfacing a plurality of host processors or channels 102 with a cache memory 106 and a bulk memory illustrated as a plurality of disk drive devices 104 for driving storage disks. FIG. 1 does not fully illustrate the cache/disk system it being understood that a complete system may have an additional storage control unit serving additional host processors, with the storage control units each having a full complement of registers as shown in application Ser. No. 207,152.

The storage control unit (SCU) 100 includes channel interface circuits 108, device interface circuits 110 and control interface circuits 112 for interfacing the SCU with the host processors, the disk drive devices and the cache memory, respectively. A BD Bus 114 is the primary data transfer bus used for transferring information between the processors 102, the disk drive devices 104 and the cache memory 106 via the channel interface circuits 108, the device interface circuits 110 and the control interface circuits 112.

The cache memory 106 includes a cache store for storing segments of data (1792 words per segment) and a random access memory (RAM) section for storing a segment descriptor table (SDT), command queues and various other global variables. The cache store stores segments of data which are most likely to be used next by the system. The SDT and the global variables must be maintained in the RAM portion of memory 106 since the memory may be connected to another storage control unit like SCU 100, this additional storage control unit also interfacing further host processors and disk drive devices.

Figures 2, 3:
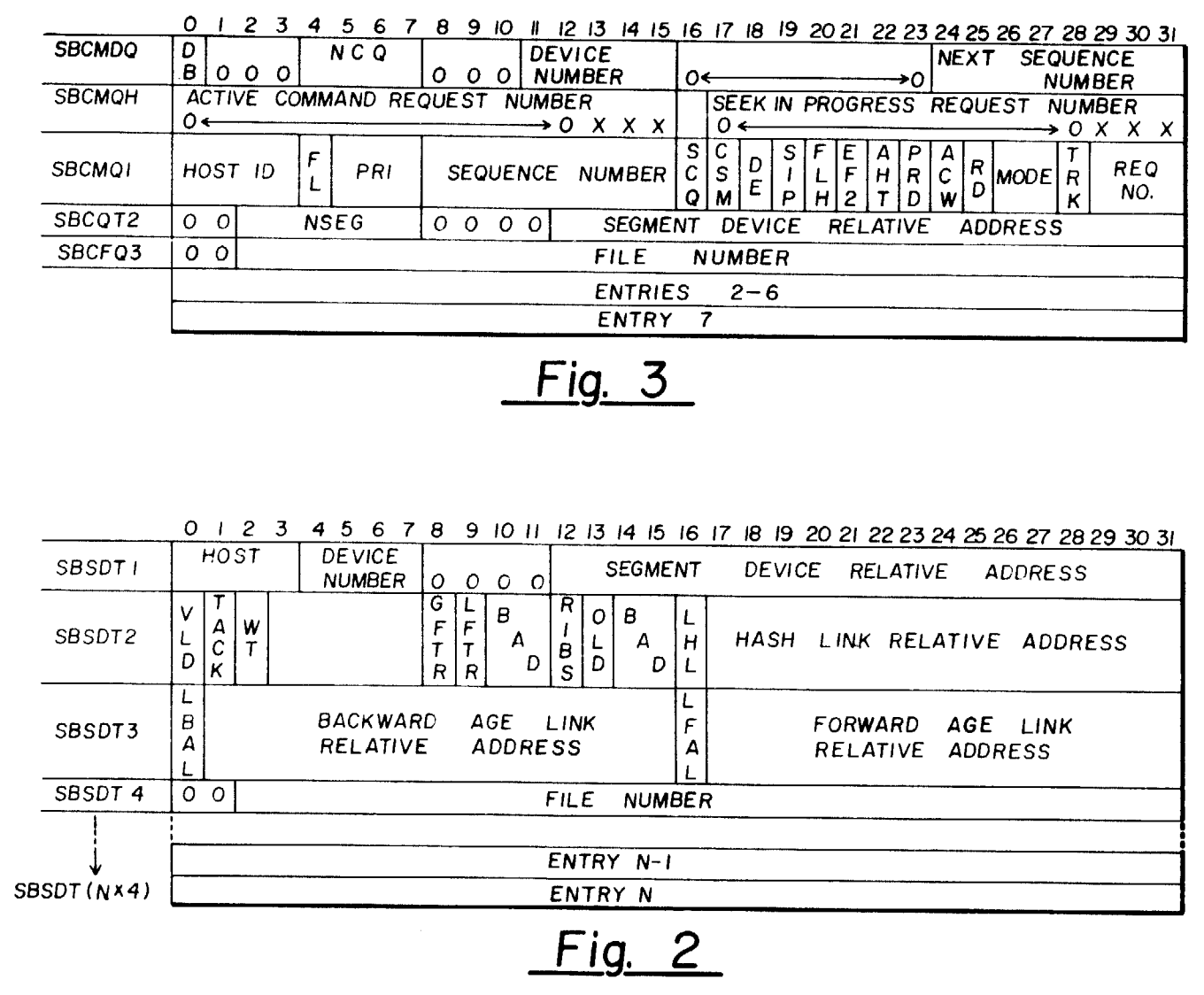

FIG. 2 illustrates the format of the segment descriptor table (SDT). There is one entry in the SDT table for each segment of data resident in the cache store portion of memory 106. Each SDT entry comprises four words. The mnemonics to the left of the word formats in FIG. 2 identify both the SDT word and its location in staging buffer 128 when the SDT is moved thereto from the SDT storage section of cache memory 106. The various fields of an SDT entry are described with reference to FIG. 16 of application Ser. No. 207,152 and certain modifications therein are described in application Ser. Nos. 354,556 and 460,737. Of particular interest with respect to the present invention is the provision in SBSDT2 of a "local floater" bit (LFLTR) whose use is described below. In this regard it might be noted that LFLTR as described herein is used in place of the "bad disk" bit of application Ser. No. 207,152, the bad disk bit now being utilized for a different purpose.

In accordance with the present invention bit 9 of SBSDT2 is designated as a "local floater" (LFLTR) indicator. This indication, when set, indicates that an attempt has been made to transfer the segment corresponding to this SDT entry from the cache store to a disk device but the transfer could not be accomplished because of a localized disk problem such as, for example, a bad spot on a disk. Bit 2 of SBSDT2 is the "written-to" (WT) indicator which indicates whether or not the associated cache segment has been written to by a processor and a copy of the written-to segment not yet transferred to a disk. This bit is set when the associated segment in the cache store is first written to and is reset after the written-to segment is successfully transferred to a disk.

FIG. 3 illustrates one command queue. There is one command queue for each of the devices 104. Each command queue includes two header words and up to seven entries (commands) with each entry having three words. The purpose of each field of a command queue is fully explained in application Ser. No. 207,152.

If a processor 102 wishes to write data to one of the devices 104, it issues a command specifying the device number and address of the data. The SCU 100 responds to the command by first checking to see if the device is busy. Assuming the device is busy the SCU 100 next checks to see if a copy of the data from the segment or segments specified by the address is resident in a segment or segments in the cache memory 106. If the addresses to be written-to are included in the segments stored in cache 106 the data from the processor is written to the cache memory and not to the device 104. A "written-to" (WT) indicator is set in the SDT entry or entries corresponding to the segment or segments written-to and the segments are written from the cache memory to the device 104 at some later time.

If the segment or segments to be written-to are not resident in the cache memory and the device is busy, the command is queued on the command queue for that device. At some later time determined by the availability of the device and the priority of the queued command, an SCU executes the command in order to bring the desired segments from the disk drive device 104 to the cache memory 106. Later, after the queued command is executed and the disk drive device signals that it has completed a seek operation, the SCU notifies the processor which originally issued the write command. The processor 102 wishing to make the write operation again issues the write command again and at this time the storage control unit brings the segment or segments into staging buffer 128, overlays them with the data from the processor, and returns the modified segment or segments to the cache memory 106.

As explained in the aforementioned application Ser. No. 354,556, when the SCU 100 has no other work to do it may search the SDT to locate segments which have been written to and trickle these segments to the devices 104 thus making space available in cache 106 for additional segments. The trickling of written-to segments takes place according to a least recently used algorithm. That is, the least recently used written-to segments are trickled first with the least recently used being determined from forward and backward age links in each SDT entry.

The operations summarized below are fully explained with reference to FIGS. 4–8 and 10–13 of application Ser. No. 354,556, the disclosure of which is incorporated herein by reference. As explained in that application, when an SCU completes its operations with respect to a command it enters an Idle Loop looking for work to do and if it finds no higher priority work to do it executes a Check Trickle routine which locates written-to segments in cache memory 106 and forms a trickle command for each command queue which does not have a trickle command if there is a written-to segment which is to be returned to the disk device serviced by the command queue. The commands thus formed are placed in the command queues. One of the conditions an SCU checks for during execution of the Idle Loop is the presence of a command in a command queue. Thus, upon entering an Idle Loop a second time, and assuming that there is no higher priority work to do (i.e. service disk interrupt or accept command from processors) the Idle Loop detects the presence of a trickle command in a command queue and branches to a Service CMDQ routine which locates the highest priority command in a queue. After the highest priority command in the queue is located, the program branches to a Cache Breakout routine, analyzes the command, and when it determines that it is a trickle command it branches to a Start Trickle routine which issues a seek start to the disk device corresponding to the command queue in which the trickle command is located. Assuming no error condition arises, the disk device locates the address where the written-to segment is to be written and issues an interrupt which an SCU may recognize when it enters the Idle Loop. At this time a Trickle Write routine is executed to actually transfer the written-to segment to its proper location on the disk.

If an error should occur such that the written-to data segment cannot be transferred to its proper location on the disk, the segment of data in the cache store should be saved and marked because it is the only good copy of the data. As explained with reference to FIGS. 4–8 and 12 of application Ser. No. 460,737, the disclosure of which is incorporated by reference, the system may recover from an error or fault of the type which prevents the transfer of a written-to segment to a disk without terminating the program. Briefly, at the time the error is detected the SDT entry for the segment is restored to a condition which accurately reflects the condition or state of the segment and a status message is formed and sent to the processor. The status message is saved by the processor until the file is ready to be closed. At that time the processor assigns new disk space to the segment, reads the segment from the cache memory 106 to the processor, sends a command to an SCU to write at the newly assigned disk space, and sends the segment back to the SCU for storage at the newly assigned space. The SCU then issues a Reset Segment command which resets the SDT entry corresponding to the segment which has been moved to the new disk space.

If a written-to segment cannot be transferred from the cache memory 106 to a disk device, the system described in application Ser. Nos. 460,737 and 354,556 would, absent the present invention, exhibit degraded performance. An SCU would attempt to accomplish the transfer each time the SCU serviced the command queues and found the trickle command as the command to be executed. To avoid this, the present invention provides for deleting the trickle command from the command queue when the command cannot be executed because of a localized disk fault. However, this alone would not solve the problem of degraded performance because an SCU, upon execution of the Check CMDQ routine would generate another trickle command for the same written-to segment. Therefore, the present invention provides for clearing a trickle command from a command queue when a local disk error prevents the transfer of the segment from the cache memory to a disk, and further provides for the setting of the local floater bit (LFLTR) in the SDT entry corresponding to the segment which cannot be transferred. LFLTR may be set during the Error Recovery routine shown in FIG. 6, step 604, of application Ser. No. 460,737 and immediately thereafter the trickle command is deleted from the command queue at step 606. The present invention further provides for testing LFLTR when trickle commands are being formed, and skipping the forming of a trickle command for any written-to segment whose corresponding LFLTR bit is set. This testing may be accomplished during execution of the Check Trickle routine illustrated in FIGS. 11A–11I of application Ser. No. 354,556, and more particularly at step 1173 in FIG. 11C of that application. When the test at step 1173 shows that LFLTR is set, the program jumps to step 1162 in FIG. 11E thereby skipping steps 1175–1190 which form the three words of a trickle command, add them to a command queue, and store the command queue in the RAM portion of cache memory 106.

The LFLTR bit is reset in response to a reset segment command issued by a host processor after the processor has assigned new disk space to the faulted segment and moved the segment to the new disk space.

While the present invention is disclosed with specific reference to a particular type of disk error occuring during execution of a trickle write command, it will be obvious that various modifications and substitutions may be made in the disclosed embodiment without departing from the spirit and scope of the invention defined by the appended claims.

The embodiments of the invention in which an exclusive property or privilege is claimed are defined as follows:

1. In a data processing system including a host processor for issuing commands, a bulk memory, a cache store for storing segments of data, a storage control unit, first means for storing a command queue and second means for storing a segment descriptor table having an entry therein corresponding to each segment of data in said cache store, said storage control unit including third means responsive to a given command from said host processor for writing data into said cache store and setting a written-to indicator in the segment descriptor table entry corrseponding to a segment of data written to in response to said given command, fourth means for searching said segment descriptor table to determine which one of the written-to segments in said cache store should be transferred to said bulk memory and forming and storing in said first means a trickle command to control said transfer, and fifth means for detecting the occurrence of an error which prevents the transfer of said one segment of data to said bulk memory, the improvement comprising:

sixth means in said storage control unit responsive to said fifth means for setting a floater indicator in the segment descriptor table entry corresponding to the segment in said cache store from which said transfer is prevented because of said error; and, seventh means in said storage control unit responsive to said sixth means for deleting from said command queue the command formed by said fourth means.

2. The improvement as claimed in claim 1 wherein said fourth means includes means for sensing said floater indicator, said floater indicator, when set, inhibiting said fourth means from forming another trickle command to control the transfer of said one segment.

3. The improvement as claimed in claim 2 wherein said bulk memory comprises a plurality of disk devices said first means comprises means for storing a separate command queue for each said disk device, and said fourth means includes means for searching said segment descriptor table and forming and placing a trickle said command in the command queue for each of said disk devices for which said fourth means determines that a written-to segment is waiting to be transferred.

4. In a data processing system of the type wherein a storage control unit includes means which forms and stores a trickle command for a segment of data which has been written-to by a host processor while the segment of data was resident in a cache store, said storage control unit including means for subsequently executing said trickle command to transfer said segment of data from said cache store to said disk device, the improvement wherein said storage control unit includes:

means for detecting an error which prevents the transfer of said written-to segment to said disk device; and, control means responsive to said detecting means for controlling said means which forms and stores said trickle command, said control means including means for deleting said stored trickle command and inhibiting the subsequent formation of another trickle command for the written-to segment of data whose transfer was prevented by said error.

5. A data processing system as claimed in claim 4 wherein:

a storage means is provided for storing a segment descriptor table, said table having an entry therein corresponding to each segment of data resident in said cache store, each entry in said table including a written-to indicator bit which is set by said storage control unit when data in the corresponding segment in said cache store is written to by said host processor and a local floater bit, said entries being linked from least recently used to most recently used by addresses stored in said entries, said means for forming and storing said trickle command including means for searching said segment descriptor table to locate the least recently used entry wherein said local floater bit is reset and the written-to bit is set, said trickle command being formed for the segment corresponding to the entry located, said control means including means for setting the local floater bit in the segment descriptor table entry corresponding to the segment of data whose transfer is prevented.

6. In a data processing system wherein a segment descriptor table is maintained for managing the transfer of segments of data between the cache store and a storage control unit, said segment descriptor table comprising a file of a plurality of entries linked from least recently used to most recently used, there being an entry in said table corresponding to each segment of data in said cache store, each entry including a written-to bit which is set by said storage control unit when the corresponding segment of data in said cache store is modified, said storage control unit including means for searching said segment descriptor table to locate the least recently used entry wherein said written-to bit is set, means responsive to said means for searching for forming and storing a command to transfer the segment of data corresponding to the located segment from said cache store to a specified disk space, and means for subsequently initiating execution of said formed command, a method of handling a segment of data which cannot be transferred to a disk device because of a disk fault, said method comprising:

providing a floater bit in each of said entries;

detecting when a segment cannot be transferred from said cache store to the disk device because of said fault;

setting the floater bit in the table entry corresponding to the segment which cannot be transferred;

deleting the formed command from its store; and, inhibiting the forming of another command to transfer the segment of data to said specified disk space as long as said floater bit is set.

7. The method as claimed in claim 6 and further comprising:

assigning new disk space to said segment of data which could not be transferred;

transferring said segment of data which could not be transferred to said specified disk space to said assigned new disk space; and, resetting said floater bit in the table entry corresponding to the segment which could not be transferred to said specified disk space.

8. The method as claimed in claim 7 including the step of setting floater bits in more than one of said table entries if the corresponding segments of data cannot be transferred to their specified disk spaces.

9. The method as claimed in claim 8 including the step of assigning said new disk space to each segment of data which could not be transferred to its specified disk space, just prior to a closing of the file.

* * * * *